United States Patent [19]

Kacal et al.

[11] 4,175,577
[45] Nov. 27, 1979

[54] MEANS AND METHOD FOR IN-LINE REMOVAL OF SEAT RINGS IN BALL VALVES

[75] Inventors: Gary W. Kacal, Rosenberg; Charles C. Partridge, Houston, both of Tex.

[73] Assignee: ACF Industries, Incorporated, New York, N.Y.

[21] Appl. No.: 902,324

[22] Filed: May 3, 1978

[51] Int. Cl.² .................. F16K 43/00; F16K 25/00
[52] U.S. Cl. .................................. 137/15; 137/315; 251/174; 251/315
[58] Field of Search .................. 137/15, 315, 316; 251/159, 174, 315

[56] References Cited

U.S. PATENT DOCUMENTS

| | | | |
|---|---|---|---|
| 3,114,386 | 12/1963 | Dumm | 251/174 |
| 3,171,429 | 3/1965 | Stürmer | 251/159 |
| 3,269,691 | 8/1966 | Meima et al. | 251/174 |
| 3,771,545 | 11/1973 | Allen | 251/174 |

FOREIGN PATENT DOCUMENTS 1215159 12/1970 United Kingdom ............ 137/316

Primary Examiner—Martin P. Schwadron
Assistant Examiner—G. L. Walton

[57] ABSTRACT

A ball valve structure has a removable upper cover plate (16) to permit the ball (34) to be removed from the valve body. A separate cam tool (90, FIGS. 8-10) after removal of the cover plate is positioned within the bore of the ball which has been partially rotated from the full open position, and upon a return rotation of the ball with the cam tool therein to a full open position an adjacent spring urged seat ring (58) is cammed away from the ball to a retracted position. A seat ring retainer (82) is then actuated to hold the seat ring in the retracted position. The cam tool is then utilized in a similar manner to cam the other opposite seat ring in retracted position. The ball may then be removed with the seat rings for replacement or repair as desired. The seat rings and seals (70) thereon may be removed and replaced in such manner without removal of the valve from the flowline in which the valve is positioned.

11 Claims, 10 Drawing Figures

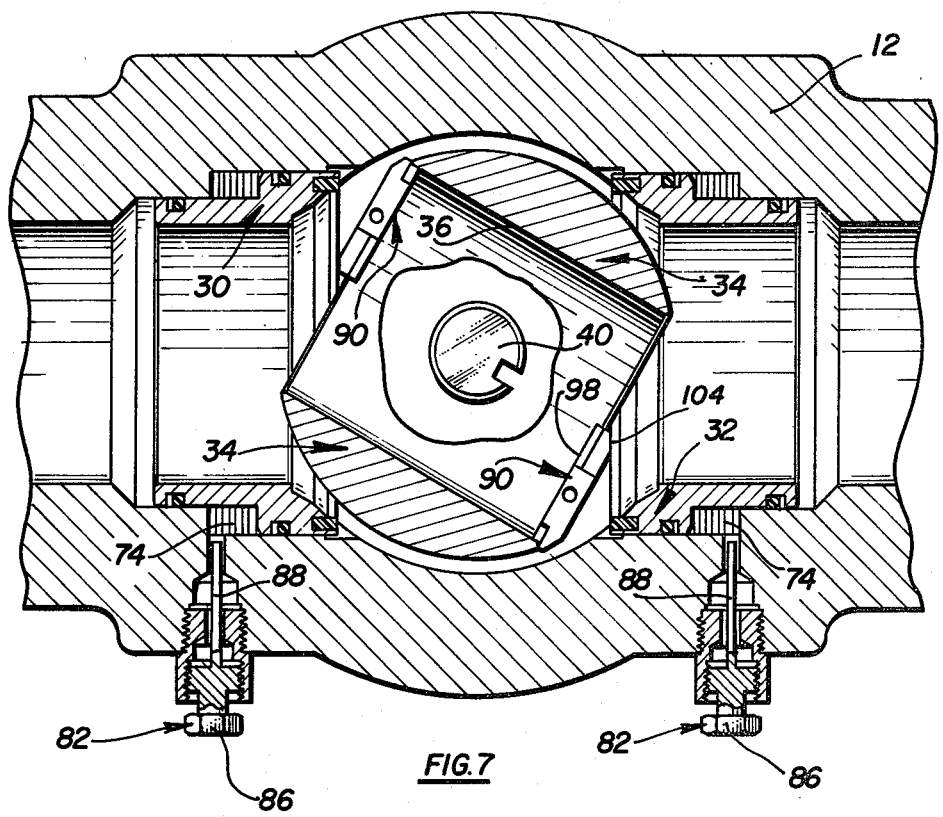
FIG. 7
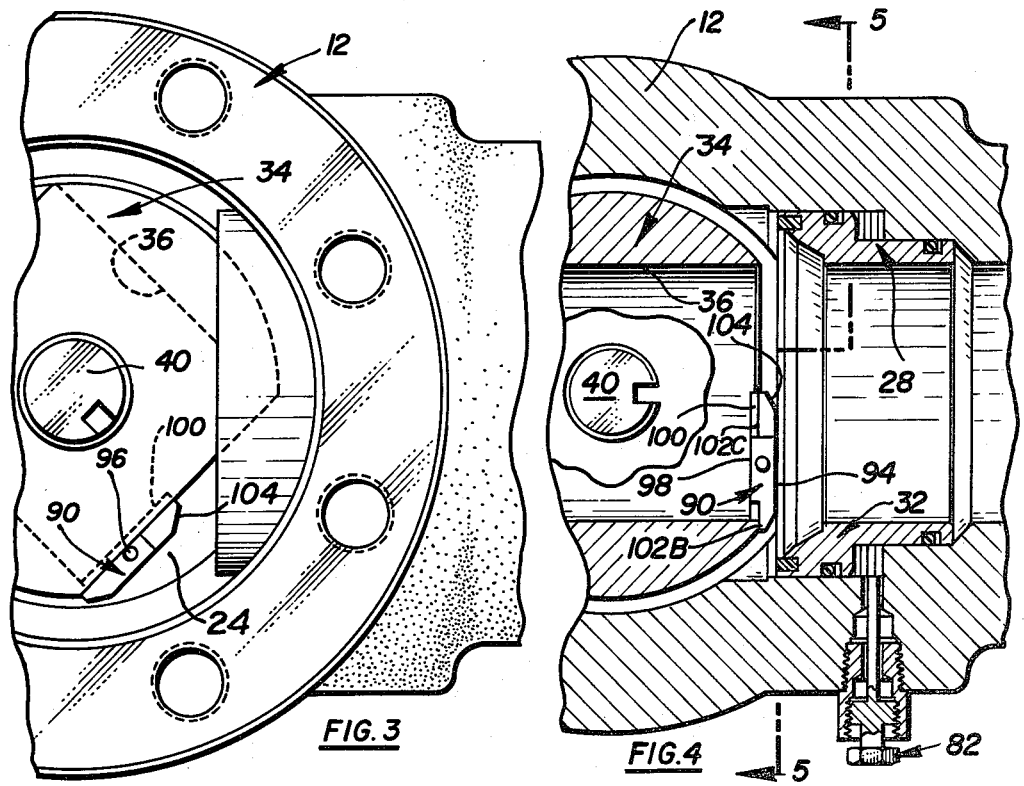
FIG. 3
FIG. 4

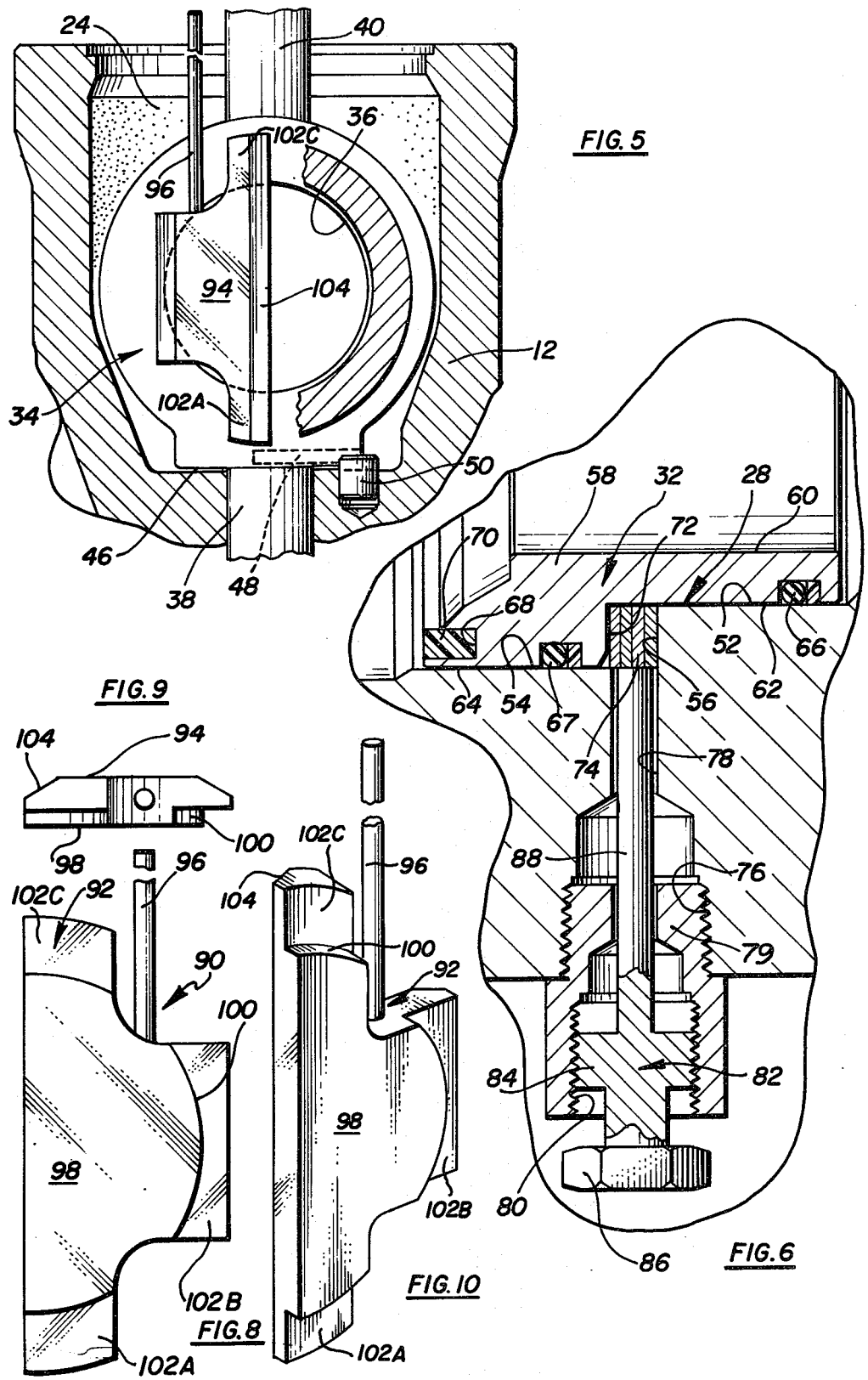

MEANS AND METHOD FOR IN-LINE REMOVAL OF SEAT RINGS IN BALL VALVES

BACKGROUND OF THE INVENTION

Heretofore, ball valves have been constructed so that the rotatable ball could be removed from the valve body for replacement or repair of the seat rings on opposed sides of the ball. Normally, a top or bottom cover plate has first been removed from the valve body and then the seat rings have been retracted and held in a retracted position until the ball is removed. Then the seat rings are removed.

For example, U.S. Pat. No. 3,114,386 dated Dec. 17, 1963 illustrates a so-called top entry ball valve in which an upper cover plate is first removed and then the spring urged seat rings on opposed sides of the ball in U.S. Pat. No. 3,114,386 are pushed manually to a retracted position. The seat rings are then held in the retracted position by pins fitting in annular grooves of the seat rings. With the seat rings retracted, the ball is removed and then the seat rings may be released and removed from the valve body.

When a valve is not in a line, the ends of the flow passage are open and a tool may be inserted in the open ends to grip the seat rings in some manner for pulling the seat rings to a retracted position. However, with the valve in place within a flowline the ends of the flow passage are closed and it is very difficult if not impossible to push the spring urged seat rings back to a retracted position where they may be retained. A relatively long travel is required for floating seat rings in a top entry ball valve to permit the seats to retract a sufficient distance for removal of the ball and the spring forces urging the seat rings toward the ball are relatively high in order to provide an adequate spring force at the extended position of the seat rings when in sealing engagement with the ball.

DESCRIPTION OF PRESENT INVENTION

The present invention is directed to a ball valve in which the seat rings and ball are easily removed from the valve body while the valve is in place within a flowline. The rotative movement of the ball is utilized to cam the seat rings away from the ball to a retracted position where they are releasably retained while the ball is removed. A cam is positioned on the ball and moves with the ball into engagement with the seat rings upon rotation and cams the seat rings away from the ball to retracted position. A separate tool may be utilized having the cam thereon and is inserted within the bore of the ball after an upper cover plate is removed. After removal of the cover plate with the valve in open position within a flowline, the ball is rotated around thirty (30) to forty-five (45) degrees from the open position to expose a portion of the open end of the bore to the valve chamber so that the camming tool can be inserted within the bore which holds the tool in position as the ball is rotated. The rotation of the ball back to full open position after the cam has been inserted within the bore results in the cam engaging the adjacent seat ring and urging the seat ring away from the ball. After the seat ring has been retained in retracted position, the ball is again rotated toward a closed position to permit removal of the tool from the bore of the ball. This procedure is repeated for the other opposed seat ring.

DESCRIPTION OF THE DRAWINGS

FIG. 3 is a top plan with the cover plate removed showing the ball rotated around 45° with respect to the full open position and with the camming tool inserted in place within the bore of the ball valve;

FIG. 4 is a cross-sectional view showing the ball with the camming tool thereon after the ball has been rotated from the position of FIG. 3 to a full open position and showing the adjacent seat assembly cammed to full retracted position;

FIG. 5 is a section taken generally along the lines 5—5 of FIG. 4 showing the cam tool in position within the bore of the ball valve;

FIG. 6 is an enlarged section of the retainer for holding the adjacent seat assembly in a retracted position for removal of the ball;

FIG. 7 is a sectional view of another embodiment of the invention in which a cam tool is positioned within each end of the bore of the ball for simultaneously camming the upstream seat assembly and downstream seat assembly into a fully retracted position upon rotation of the ball to a full open position;

FIG. 8 is a rear elevation of the cam tool removed from a ball valve;

FIG. 9 is a top plan of the tool shown in FIG. 8; and

FIG. 10 is a perspective of the tool showing the rear face thereof which is received within the bore of the ball.

Figure 1:
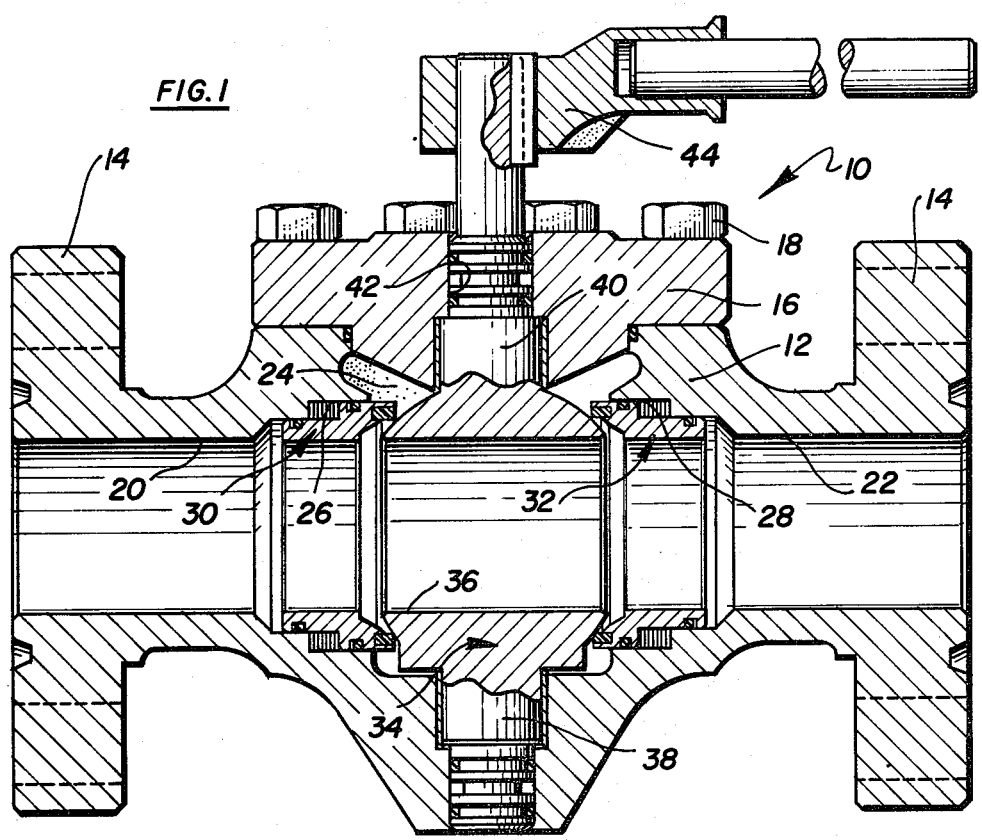
FIG. 1 is a longitudinal section of a ball valve of a top entry type having spring loaded seat rings.
Figure 2:
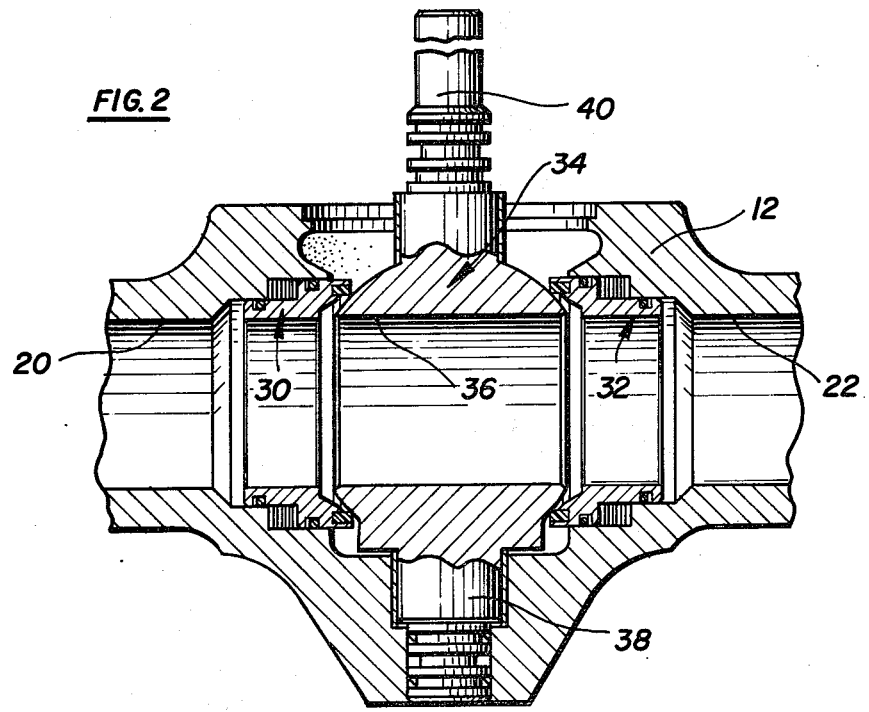
FIG. 2 is a longitudinal section similar to FIG. 1 but showing the upper cover plate removed for removal of the ball and opposed seat rings.

Referring now to the drawings, the ball valve structure indicated generally at 10 includes a valve body 12 having end flanges 14 which are adapted to be bolted to a flowline in which ball valve 10 is positioned. An upper cover plate 16 is bolted by studs 18 to body 12. An inlet flow passage is indicated at 20 and an outlet flow passage is indicated at 22.

A valve chamber 24 is provided between flow passage 20 and flow passage 22. A stepped upstream recess forming an upstream seat pocket is shown at 26 about inlet flow passage 20 and a downstream recess 28 forming a downstream seat pocket is shown about outlet flow passage 22. An upstream seat assembly is indicated at 30 and a downstream seat assembly is indicated at 32.

A ball is indicated generally at 34 and has a central bore 36 therethrough. A lower stem 38 is mounted in a suitable bore in body 12. An upper stem 40 extends through an opening 42 in top cover plate 16. A suitable handle 44 is secured to the upper end of stem 40 for movement of ball 34 between open and closed positions relative to flow passages 20 and 22. As shown in FIG. 5, a lower supporting surface 46 on ball 34 is seated on body 12 for rotation. Ball 34 has a lower arcuate groove at 48 to receive a stop pin 50 on body 12 to stop rotative movement.

Respective upstream and downstream recesses 26 and 28 and associated upstream and downstream seat assemblies 30 and 32 are generally identical and reference is made to FIG. 6 for a detailed description of downstream recess 28 and associated downstream seat assembly 32, it being understood that upstream seat assembly 30 and associated recess 26 are identical to that shown in FIG. 6. Stepped recess 28 defines small diameter circumferential wall surface 52 and a large diameter circumferential wall surface 54. An annular shoulder 56 extends perpendicularly to and connects surfaces 52 and 54. Seat ring assembly 32 includes a metal seat ring 58 having an inner periphery 60, a small diameter outer peripheral surface 62 and a large diameter outer diameter peripheral surface 64. Respective O-ring 66 and 67 extend around surfaces 62 and 64 and are received within grooves therein. An annular groove 68 in seat ring 58 receives a resilient face seal 70 which is adapted to engage in sealing relation the adjacent spherical surface of ball 34. An annular shoulder 72 extends perpendicularly to and connects outer peripheral surfaces 62 and 64.

Fitting between spaced shoulders 56 and 72 are a plurality of annular wave springs 74 to continually urge seat assembly 32 against ball 34. It is noted that seat assembly 32 floats within recess 28 and has a relatively long travel since the seat assembly must retract a sufficient amount to permit ball 34 to be removed from body 12. Thus, wave springs 74 are adequate to provide a sufficient sealing force at the full extended position of seat assembly 32 between resilient face seal 70 and the adjacent sealing surface of ball 34.

Normally, a grease fitting on the valve body provides an emergency sealant for leakage in a ball valve of this type and fits within an opening through the valve body. As shown in FIG. 6, an opening for the grease fitting is utilized to receive a retainer for the seat assembly. The opening comprises a large diameter threaded portion 76 and a small diameter connecting portion 78 which extends to wave springs 74. A means to retain seat assembly 32 in a full retracted position fits within the opening and comprises an outer housing 79 which is externally threaded within opening 76. Housing 79 has an internally threaded central bore 80. A threaded plunger indicated generally at 82 has an externally threaded body 84 threaded within central bore 80. Plunger 82 has an integral head 86 on its outer end and an elongated pin 88 on its inner end extending from body 84. Upon rotation of head 86 by a suitable wrench or the like, the inner end of pin 88 engages wave springs 74 to compress springs 74 against the adjacent circumferential surface 62 of seat assembly 32 to hold seat assembly 32 in a retracted position. Wave springs 74 are made inoperable when engaged by pin 88 in a tight frictional relation. Plunger 82 may be unthreaded for release of seat assembly 32.

Referring to FIGS. 8-10, a cam tool which comprises an important part of this invention is shown generally at 90. Tool 90 includes a base or main body 92 which has a front face 94. A handle 96 extends from base 92 for manual gripping and manipulation of tool 90. A rear face 98 which is of a size to fit within bore 36 extends from one side of body 92 and a peripheral shoulder 100 is provided between inner face 98 and intermediate face portions 102A, 102B, and 102C which comprise arcuate segments to engage the adjacent surface of ball 34 in abutting relation when rear face 98 and shoulder 100 are received within bore 36. Front face 94 has a cam surface 104 which is adapted to engage the adjacent seat assembly for camming the seat assembly to a rearward position where it may be releasably retained.

In operation, for removal of ball 34 and seat assemblies 30 and 32 for repair, replacement, or similar purposes, and with valve 10 remaining in the flowline, cover plate 16 is first removed. After cover plate 16 is removed, ball 34 is rotated from the open position to a position around thirty (30) to forty-five (45) degrees from the full open position such as shown in FIG. 3 thereby to easily expose to chamber 24 and make accessible from the upper portion of body 12 a portion of bore 36 in ball 34. In this position tool 90 is then inserted from the top of body 12 and is positioned in bore 36 with intermediate face portions 102A, 102B, and 102C in abutting relation with the adjacent surface of ball 34. Shoulder 100 is in closely spaced concentric relation with the adjacent peripheral surface of bore 34 as shown in FIG. 3. Then, ball 34 is rotated toward full open position and cam 104 on tool 90 engages the adjacent face of the associated seat assembly 32 to move seat assembly 32 to a full retracted position as shown in FIG. 6. In this position, plunger 82 is rotated so that pin 88 engages wave springs 74 in tight relation to hold seat assembly 32 in the retracted position shown in FIG. 6. Depending on sizes and tolerances, seat assembly 32 will probably be cammed to a full retracted position before ball 34 is rotated to a full open position. In this event, plunger 82 may be rotated to hold seat assembly 32 in such retracted position without any rotation of ball 34 to the full open position.

After seat assembly 32 is retained, ball 34 is again rotated back to a partially closed position and then tool 90 is removed from the end of bore 36 adjacent seat assembly 32 and next positioned within the opposite end of bore 34 adjacent seat assembly 30. The procedure for retaining seat assembly 30 in full retracted position is the same as that for seat assembly 32. After the seat assemblies 30 and 32 have been retained in the fully retracted position, ball 34, after removal of tool 90, may be removed from the top opening in valve body 12. Then, the seat assemblies 30 and 32 may be released from the retracted position and also removed from the opening in valve body 12. New or repaired seat assemblies 30 and 32 may be reinserted in valve body 12 and may be moved to a retracted position where they are held by plungers 82 to permit reinsertion of valve ball 34 along with cover plate 16.

It may be desirable to employ two tools simultaneously such as shown in FIG. 7. This permits the simultaneous camming of seat assemblies 30 and 32 to a retracted position where they are held in the retracted position to permit removal of ball 34.

Thus, the present invention provides an arrangement in which the rotation of ball 34 results in the camming of the floating seat assemblies 30 and 32 to a retracted position where they are held by frictional engagement with wave springs 74. The rotation of ball 34 provides a uniform, closely controlled movement for camming of seat assemblies 30 and 32 to the retracted position and has been found to operate effectively while valve 10 remains in place in the flowline.

What is claimed is:

1. A method for removing a spring-loaded seat ring from a ball valve having a body in which a ball is mounted for rotation and a cover plate is removably connected to the body for permitting removal of the ball and seat ring, the seat ring being mounted for longitudinal movement between a retracted position spaced from the ball and an extended position biased into sealing relation with the ball; said method comprising the following steps:

removing the cover plate from the valve body to permit access to the ball;

inserting a cam within the valve body and positioning the cam on the ball in a spaced relation to the adjacent seat ring;

then rotating the ball so that the cam engages the seat ring upon such rotation and cams the seat ring into a retracted position spaced from the ball;

actuating a seat ring retainer manually to hold the seat ring in the releasable retracted position;

then removing the cam and ball;

and releasing the seat ring for removal from the valve body.

2. A method for removing a spring-loaded seat ring assembly from a ball valve having a body with a valve chamber in which a ball is mounted for rotation, and a cover plate removably connected to the body for permitting removal of the ball and seat ring assembly, the seat ring assembly being mounted for longitudinal movement between a retracted position spaced from the ball and an extended position biased into sealing relation with the ball; said method comprising the following steps:

removing the cover plate from the valve body to permit access to the valve chamber;

inserting a camming tool within the bore of the ball with the ball being rotated out of a full open position;

then rotating the ball with the camming tool therein toward open position so that the tool engages the seat assembly upon such rotation and cams the seat assembly into a retracted position spaced from the ball;

manually actuating a seat assembly retainer to hold the seat assembly in a releasable retracted position;

then removing the camming tool and ball from the valve body;

and next releasing the seat assembly for removal from the valve body.

3. A method for removing a spring-loaded seat ring from a ball valve having a body in which a ball is mounted for rotation between open and closed positions and a cover plate is removably connected to the body for permitting removal of the ball, the seat ring being mounted for longitudinal movement between a retracted position spaced from the ball and an extended position biased into sealing relation with the ball; said method comprising the following steps:

removing the cover plate from the valve body to permit access to the ball;

inserting a cam within the valve body and positioning the cam within the bore of the ball in a spaced relation to the adjacent seat ring while the ball is out of fully opened position;

then rotating the ball toward fully opened position so that the cam engages the seat ring upon such rotation and cams the seat ring into a retracted position spaced from the ball;

actuating a seat ring retainer to hold the seat ring in retracted position; and removing the cam and ball from the valve body.

4. A method for removing a spring-loaded seat ring from a ball valve having a body in which a ball is mounted for rotation between open and closed positions and a cover plate is removably connected to the body for permitting removal of the ball and seat ring, the seat ring being mounted for longitudinal movement between a retracted position spaced from the ball and an extended position biased into sealing relation with the ball; said method comprising the following steps:

removing the cover plate from the valve body to permit access to the ball;

positioning a cam on the ball in a spaced relation to the adjacent seat ring while the ball is out of a fully opened position;

then rotating the ball toward a fully open position with the cam thereon engaging the seat ring upon such rotation and camming the seat ring into a retracted position spaced from the ball;

actuating a seat ring retainer to hold the seat ring in a releasable retracted position;

then removing the cam and ball from the valve body;

and releasing the seat ring for removal from the valve body.

5. A ball valve having a valve body with inlet and outlet flow passages and a valve chamber between the flow passages, a ball mounted in said valve chamber for rotation between open and closed positions relative to the flow passages and having a bore therethrough, a seat ring mounted in said body adjacent the ball for floating longitudinal movement and being spring biased into sealing engagement with the ball, a cover plate removably connected to the valve body permitting removal of the ball from the valve chamber when the plate is removed from the body, a camming tool insertable within the bore of the ball from the valve chamber upon removal of the cover plate to engage and cam the adjacent seat ring to a retracted position upon at least a partial rotation of the ball, and means to releasably hold the seat ring in a retracted position after the seat ring has been cammed to retracted position to permit removal of the ball and then subsequent removal of the seat ring.

6. The ball valve as set forth in claim 5 wherein the camming tool comprises a substantially semi-circular shoulder which fits within the bore of the ball in closely fitting relation with the adjacent wall surface defining the bore, said tool being between the seat ring and the ball and having a cam portion on an edge thereof for engaging the seat ring upon rotation of the ball from at least a partially closed position toward an open position.

7. The ball valve as set forth in claim 6 wherein said camming tool further comprises a base and a rod connected to the base for manual manipulation of the tool.

8. In a ball valve including a valve body having inlet and outlet flow passages, a ball mounted in said body for rotation between open and closed positions relative to the flow passages, a pair of seat rings mounted in said body adjacent opposed sides of the ball and being spring biased into sealing engagement with the ball, a cover plate removably connected to the valve body permitting removal of the ball from the body when the plate is removed from the body, a cam insertable between the ball and each seat ring when the ball is out of a fully open position and after removal of the cover plate to cam the seat ring to a retracted position upon at least a subsequent partial rotation of the ball, and means to releasably hold the seat rings in a retracted position after the seat rings have been cammed to retracted position to permit removal of the ball and then subsequent removal of the seat rings.

9. In a ball valve as set forth in claim 8 wherein said means to releasably hold the seat rings in retracted position is manually actuated from a position outside the valve body.

10. In a ball valve as set forth in claim 8 wherein each of the seat rings has an annular resilient face seal adapted to contact the ball in sealing relation, and a spring is positioned behind each seat ring to urge continuously the associated seat ring into engagement with the ball.

11. A ball valve having a valve body with inlet and outlet flow passages and a valve chamber between the flow passages, a ball mounted in said valve chamber for rotation between open and closed positions relative to the flow passages and having a bore therethrough, a seat ring mounted in said body adjacent the ball for floating longitudinal movement and being spring biased into sealing engagement with the ball, a cover plate removably connected to the valve body permitting removal of the ball from the valve chamber when the plate is removed from the body, a cam insertable from the valve chamber between the ball and the seat ring when the ball is out of a fully open position after removal of the cover plate to engage and cam the adjacent seat ring to a retracted position upon at least a partial rotation of the ball thereafter, and means to releasably hold the seat ring in a retracted position after the seat ring has been cammed to retracted position to permit removal of the ball and then subsequent removal of the seat ring.

* * * * *